UNITED STATES PATENT OFFICE.

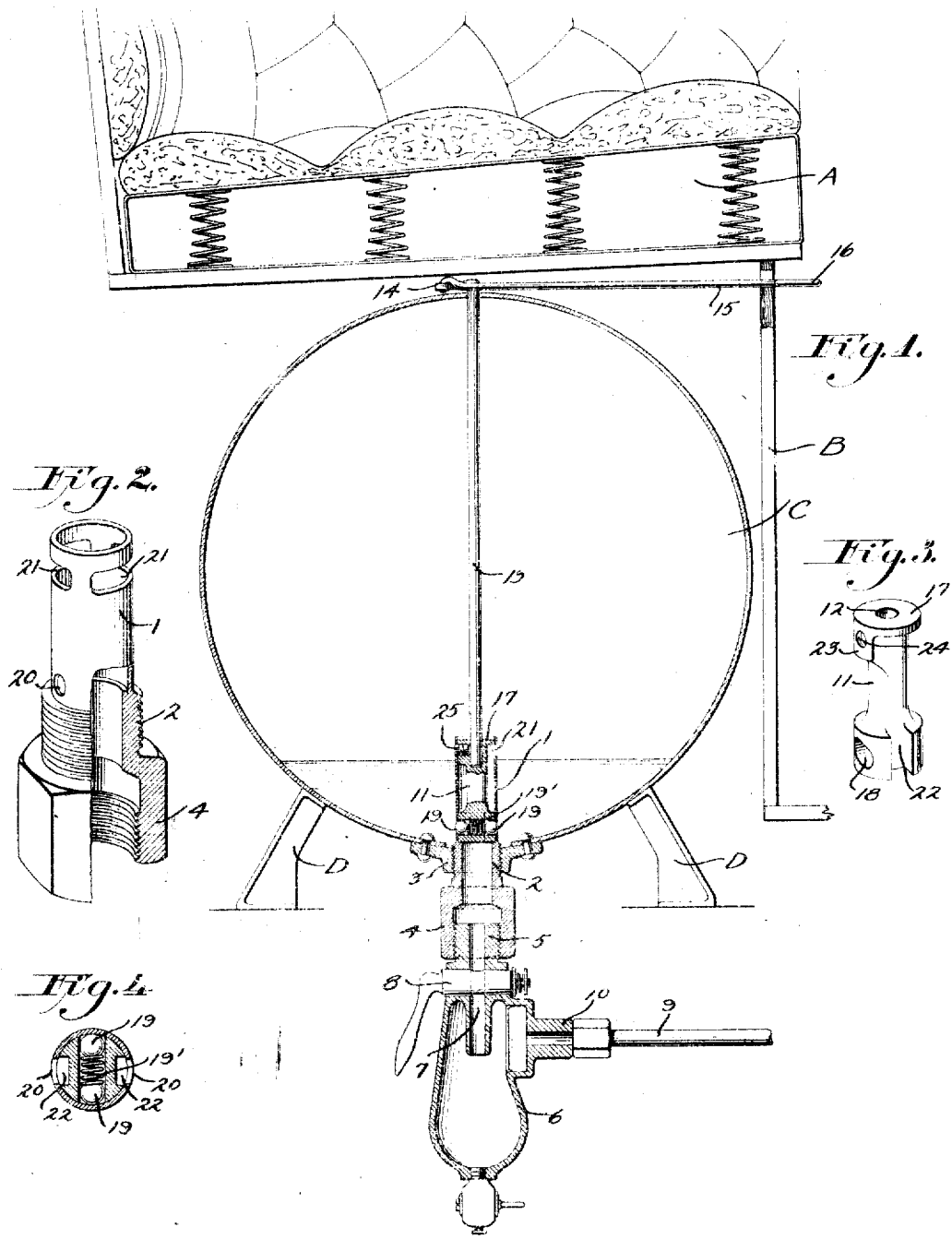

CHARLES HERING, OF NEW YORK, N. Y.

TANK ATTACHMENT.

1,355,742.

Specification of Letters Patent.   Patented Oct. 12, 1920.

Application filed November 25, 1919. Serial No. 340,670.

*To all whom it may concern:*

Be it known that I, CHARLES HERING, a citizen of the United States, and a resident of the city of New York, Mariners Harbor, borough of Richmond, in the county of Richmond and State of New York, have invented a new and Improved Tank Attachment, of which the following is a full, clear, and exact description.

The present invention relates to a tank attachment and has particular reference to means for establishing communication between the tank and the fuel feed conduit for internal combustion engines, especially as used in motor vehicles.

The primary object of the invention is to provide means for warning the driver of a motor vehicle before the fuel contained in the fuel tank has been completely exhausted so that he may take advantage of the fact and reach a filling station before the fuel has been entirely used up.

In realizing the advantages of the invention as contemplated in the present instance, it is proposed to establish a normally open communication between the tank and the fuel feed conduit, and as soon as the fuel reaches a predetermined level, such for instance as below this normally open communication, to cut off the feed which will leave some fuel still in the tank and by means of an auxiliary communication, establish a feed of the fuel thus left in the fuel feed conduit.

A further object of the invention is to so arrange the parts that they may be used in connection with a conventional type of equipment, thus overcoming the necessity of departing from the construction of the tank or the fuel feed conduit in equipping the same with the invention.

A still further object is to so construct the attachment that it may be manufactured at a comparatively modest cost and sold as an accessory on the market, thus enabling almost any one, regardless of their mechanical skill, to equip the fuel tank with the invention and realize the advantages of the same.

With these and further objects in view, the invention will be more readily understood upon reference to the accompanying drawing in which an illustrative embodiment of the invention is shown with the existing novelty particularly pointed out in the subjoined claims.

In said drawings—

Figure 1 is a cross sectional view through a conventional type of fuel tank showing the relative position of the driver's seat and the fuel feed conduit with its associated parts.

Fig. 2 is a perspective view, partly in section, of a part of the attachment.

Fig. 3 is a side elevation of an interior part of the attachment.

Fig. 4 is a cross section taken through the attachment; and

Fig. 5 is a view in elevation of the manipulating rod for the auxiliary communication.

Referring to the drawings in detail, we will consider the invention for the purpose of illustration, as used in connection with a fuel tank for motor vehicles which in many instances is located beneath the front seat A, with the front edge thereof supported by the upright partition B, and with the tank C confined beneath the seat and in back of the upright partition B. The tank may be supported by the brackets D so as to prevent vibration from dislodging the same.

It so happens that many drivers are apt to neglect keeping the level of the fuel, which for convenience will be hereinafter referred to as gasolene, at a level which will insure a sufficient quantity to be always on hand to cover the mileage intended. Very often the gasolene will give out at a locality remote from a filling station, and in view of such inconvenience the present invention proposes to provide an attachment which may be used in connection with a conventional type of equipment which will establish a normally open discharge considerably above the bottom of the tank so that just as soon as the level of the gasolene recedes below the level of this normally open discharge the feed will be cut off, thus warning the driver that there is only enough gasolene left to reach a filling station. To use this emergency quantity of gasolene he will realize on an auxiliary discharge and establish a communication between the bottom of the tank and the fuel feed reservoir so that this emergency quantity may be fed to the carbureter.

In its preferred form the attachment comprises a cylindrical casing 1 which is provided with a threaded portion 2 made to be received by the nipple 3 in the bottom of the tank, and with an internally threaded coupling 4 which is made to receive the threaded end 5 of a sediment receptcale 6. This sediment receptacle is provided with an axial bore 7 which terminates in the threaded end and above the bottom of the receptacle. A valve 8 is also provided for cutting off the flow from the receptacle to the fuel feed conduit 9 which is connected to the receptacle as at 10.

The cylindrical casing 1 is of a desired height according to the size of the tank and the quantity of gasolene that is to be maintained as an emergency supply. Rotatably mounted in the casing 1 is a ball valve carrier 11 which is provided with an axial opening 12 in the top thereof made to receive the end of an actuating rod 13 which extends vertically of the tank and terminates with its end exterior thereof and on which is mounted a short radial arm 14, one end of which being fastened to a manipulating rod 15 which extends transversely of the tank through the vertical partition B, with a hand hold 16 provided at the end thereof.

The ball valve carrier 11 is somewhat cylindrical in shape, with the exception that its intermediate portion is reduced in diameter to provide a disk-shaped head 17, the diameter of which being substantially that of the diameter of the casing 1 so that a tight fit is made between the inner circumference of the casing and the periphery of the disk-shaped head. This will, of course, close the top of the casing 1 in so far as concerns the discharge of gasolene through the casing. The opposite end of the ball valve carrier is of a diameter substantially that of the diameter of the casing and is constructed with a transverse or radial bore 18 made to receive a pair of oppositely spaced balls 19 with a spring 19' confined between the same. A pair of diametrically opposed openings 20 are provided in the side of the casing 1 at a point adjacent the balls 19, so that the said balls may be seated therein and close the openings 20 to discharge gasolene through the casing. The side of the casing at a point adjacent the top thereof is slotted as at 21 so that with the ball valve carrier reduced in diameter, a communication can be established between the tank through the slots 21 and through the longitudinal recesses 22 in the opposite end of the carrier to the sediment receptacle 6. A lug 23 is provided on the side of the ball carrier 11 just below the disk-shaped head 17 and is constructed with a threaded opening 24 made to receive a set screw 25, the set screw being received in this opening to leave its end protruding therefrom so as to work in one of the slots 21, thus confining the ball valve carrier 11 in the casing 1 in so far as vertical movement is concerned, but at the same time permitting the ball valve carrier to be rotated by the rod 13 and the manipulating rod 15 about 90 degrees, or at least far enough to unseat the balls 19 from the openings 20 and thus establish a communication or discharge through the openings and the longitudinal recesses 22 which, when the balls are unseated, will register with the openings 20 to the sediment cup 6 and in turn to the fuel supply conduit 9.

From the above it will be readily seen that normally the balls 19 will be seated in the openings 20 with a discharge established through the slots 21 of the casing 1, through the longitudinal recesses 22, through the sediment cup 6, and, in turn, through the fuel supply conduit 9. However, just as soon as the level of the gasolene recedes below the slots 21, the fuel will be cut off, and by pulling outwardly on the manipulating rod 15 a rotation of the rod 13 will be imparted through the arm 14, and in turn a rotation of the ball valve carrier 11 which will unseat the balls from the openings 20, thus establishing a communication or discharge through these openings to the line of feed. This will enable the emergency supply of gasolene to be used.

Having thus described my invention, what I claim as new and desire to secure by Letters Patent is:

1. In a tank having an outlet, the combination of a connection having a normally open discharge above the lowermost level of the liquid contained in the tank, and an auxiliary discharge below said normally open discharge, adapted to establish an outlet through the connection for the liquid when the level thereof drops below said normally open discharge; said auxiliary discharge embodying a movable ball valve closure, and means exterior of the tank for manipulating the same.

2. In a tank having an outlet, the combination of a connection having a normally open discharge above the lowermost level of the liquid contained in the tank, and an auxiliary discharge below said normally open discharge, adapted to establish an outlet through the connection for the liquid when the level thereof drops below said normally open discharge; said auxiliary discharge embodying a spring pressed movable ball valve closure and means exterior of the tank for manipulating the same.

3. An attachment for fuel tanks comprising a casing adapted to be received by the outlet opening in the tank and presented above the bottom of the tank, said casing having a normally open discharge and a normally closed discharge, said normally closed discharge comprising diametrically opposed openings with ball valves seated therein, said ball valves being carried by means rotatably supported in said casing whereby the ball valves may be rotated away from said openings to establish a discharge communicating therethrough.

4. An attachment for fuel tanks comprising a casing adapted to be received by the outlet opening in the tank and presented above the bottom of the tank, said casing having a normally open discharge and a normally closed discharge, said normally closed discharge comprising diametrically opposed openings with ball valves seated therein, said ball valves being carried by means rotatably supported in said casing, a spring mounted between said balls having a tendency to maintain the same seated in said openings under tension, and means for rotating said balls away from said openings to establish a discharge communication therethrough with the spring maintaining the balls in frictional contact with the inside of the casing.

CHARLES HERING.